US010050283B2

(12) United States Patent
Alonso-Vante et al.

(10) Patent No.: US 10,050,283 B2
(45) Date of Patent: Aug. 14, 2018

(54) PROCESS FOR PREPARING NANOPARTICLES OF A CATALYST FOR CATHODIC REDUCTION OF DIOXYGEN IN THE PRESENCE OF METHANOL

(71) Applicants: CENTRE NATIONAL DE LA RECHERCHE SCIENTIFIQUE (C.N.R.S), Paris (FR); UNIVERSITE DE POITIERS, Poitiers (FR)

(72) Inventors: Nicolas Alonso-Vante, Buxerolles (FR); Jiwei Ma, Poitiers (FR); Aldo Gago, Poitiers (FR)

(73) Assignees: CENTRE NATIONAL DE LA RECHERCHE SCIENTIFIQUE (C.N.R.S), Paris (FR); UNIVERSITE DE POITIERS, Poitiers (FR)

(*) Notice: Subject to any disclaimer, the term of this patent is extended or adjusted under 35 U.S.C. 154(b) by 0 days.

(21) Appl. No.: 14/409,155

(22) PCT Filed: Jun. 20, 2013

(86) PCT No.: PCT/EP2013/062928
§ 371 (c)(1),
(2) Date: Dec. 18, 2014

(87) PCT Pub. No.: WO2013/190060
PCT Pub. Date: Dec. 27, 2013

(65) Prior Publication Data
US 2015/0340708 A1 Nov. 26, 2015

(30) Foreign Application Priority Data

Jun. 22, 2012 (FR) .................... 12 55944

(51) Int. Cl.
*H01M 4/92* (2006.01)
*H01M 4/88* (2006.01)
*H01M 8/1011* (2016.01)
*H01M 4/86* (2006.01)

(52) U.S. Cl.
CPC ......... *H01M 4/921* (2013.01); *H01M 4/8882* (2013.01); *H01M 4/923* (2013.01); *H01M 4/926* (2013.01); *H01M 4/928* (2013.01); *H01M 8/1011* (2013.01); *H01M 2004/8689* (2013.01); *Y02E 60/523* (2013.01)

(58) Field of Classification Search
CPC ..... H01M 4/921; H01M 4/8882; H01M 4/926
USPC ........................................ 429/524
See application file for complete search history.

(56) References Cited

U.S. PATENT DOCUMENTS

| 7,781,364 B2 * | 8/2010 | Zelenay | H01M 4/8605 429/485 |
| 7,851,399 B2 * | 12/2010 | Choi | H01M 4/9016 429/523 |
| 7,887,972 B2 | 2/2011 | Allexandrovichserov et al. | |
| 7,923,171 B2 | 4/2011 | Alexandrovichserov et al. | |
| 8,383,287 B2 | 2/2013 | Ueno et al. | |
| 2004/0096728 A1 * | 5/2004 | Campbell | B01J 27/02 502/104 |
| 2006/0264322 A1 * | 11/2006 | Manthiram | B01J 23/8913 502/182 |
| 2007/0078052 A1 | 4/2007 | Grinberg et al. | |
| 2007/0122683 A1 | 5/2007 | Alexandrovichserov et al. | |
| 2007/0122686 A1 | 5/2007 | Alexandrovichserov et al. | |
| 2007/0184332 A1 | 8/2007 | Park et al. | |
| 2007/0190397 A1 | 8/2007 | Alexandrovichserov et al. | |
| 2008/0318106 A1 | 12/2008 | Kwak et al. | |
| 2009/0011311 A1 | 1/2009 | Alexandrovichserov et al. | |
| 2010/0129698 A1 | 5/2010 | Okada et al. | |
| 2010/0203420 A1 | 8/2010 | Ueno et al. | |
| 2010/0233070 A1 | 9/2010 | Alonso-Vante et al. | |
| 2010/0323274 A1 * | 12/2010 | Ueno | H01M 4/90 429/487 |

FOREIGN PATENT DOCUMENTS

| CN | 102101056 | 6/2011 | |
| JP | 2005508450 | 3/2005 | |
| JP | 2006252798 | 9/2006 | |
| JP | 2007243817 | 9/2007 | |
| JP | 2008258150 | 10/2008 | |
| JP | 2008258150 A | * 10/2008 | .............. H01M 4/90 |
| JP | 2010178577 | 8/2010 | |
| JP | 2011143476 | 7/2011 | |
| WO | WO-9818171 | 4/1998 | |

OTHER PUBLICATIONS

Elezovic et al. (Int. J. Hydrogen Energy 32 (2007), 1991-1998).*
Cao, Dianxue, et al., J. Electrochem. Soc., 2006, 153, A869-A874.*
Machine translation JP2008258150A.*
Gochi-Ponce, et al., "Synthesis and electrochemical characterization of a novel platinum chalcogenide eletrocatalyst with an enhanced tolerance to methanol in the oxygen reduction reaction", 2006, pp. 1487-1491, vol. 8, Electrochemistry Communications.
International Search Report for PCT/EP2013/062928 dated Aug. 23, 2013.
French Search Report for FR 1255944 dated Jan. 22, 2013.
Wang et al: "Synthesis and characterization of Pt—Se/C electrocatalyst for oxygen reduction and its tolerance to methanol", Journal of Power Sources, Elsevier SA, CH, vol. 171, No. 2, (Sep. 8, 2007), pp. 471-476.
Cyril Delacote et al: "Aqueous-based synthesis of ruthenium-selenium catalyst for oxygen reduction reaction", Faraday Discussions, vol. 140, (Aug. 20, 2008), pp. 269-281.
Serov A A et al: "Synthesis, characterization and catalytic activity of RuFeSe/C as a cathode catalyst for low-temperature fuel cells", Catalysis Communications, Elsevier Science, Amsterdam, NL, vol. 10, No. 11, (Jun. 10, 2009), pp. 1551-1554.

(Continued)

*Primary Examiner* — Miriam Stagg
*Assistant Examiner* — Victoria H Lynch
(74) *Attorney, Agent, or Firm* — B. Aaron Shuman, Esq.; Stites & Harbison, PLLC

(57) ABSTRACT

The invention relates to a process for preparing nanoparticles of a catalyst for cathodic reduction and which is tolerant to methanol, these nanoparticles comprising a metallic center and a submonolayer of a chalcogen.

32 Claims, 5 Drawing Sheets

(56) References Cited

OTHER PUBLICATIONS

Feng Y et al: "Chalcogenide metal centers for oxygen reduction reaction: Activity and tolerance", Electrochimica ACTA, Elsevier Science 'Publishers, Barking, GB, vol. 56, No. 3, (Oct. 31, 2010), pp. 1009-1022.
Christina M Johnston et al: "Se-modified Ru nanoparticles as ORR catalysts Part 1: Synthesis and analysis by RRDE and in PEFCs", Journal of Electroanalytical Chemistry, vol. 662, No. 1, (Jul. 24, 2011) pp. 257-266.

* cited by examiner

PROCESS FOR PREPARING NANOPARTICLES OF A CATALYST FOR CATHODIC REDUCTION OF DIOXYGEN IN THE PRESENCE OF METHANOL

The present invention relates to a method for preparing catalyst nanoparticles for cathode reduction of dioxygen and tolerant to methanol, these nanoparticles comprising a metal center and a sub-monolayer of a chalcogen.

The invention also relates to catalyst nanoparticles which may be obtained with said method. The invention also relates to a cathode for a cell, notably for a direct methanol fuel cell comprising said nanoparticles.

Fuel cells may substantially improve energy conversion efficiency, reduce noxious emissions and dependency on petroleum as an energy source.

This technology has wide applications in transportation and in portable electric or electronic apparatuses such as portable telephones.

The use of methanol in fuel cells is well known.

Nevertheless, the cathodes conventionally used in this type of cell, notably based on platinum, may oxidize the methanol, so that the efficiency of the cell is affected by this.

Several documents have described improvements of cathodes used in fuel cells in the presence of methanol.

Document WO 2010/096616 describes a method for obtaining $CoSe_2$ nanoparticles supported on carbon as a cathode for fuel cells in the presence of methanol.

Document U.S. Pat. No. 7,851,399 describes a method for preparing catalyst nanoparticles comprising a transition metal and a chalcogen as a cathode for fuel cells in the presence of methanol.

A method for preparing a platinum-sulfide catalyst supported on carbon, by heat treatment of a chemical precursor obtained by reaction of sulfur and of platinum salts at room temperature, has been described (Y. Gochi-Ponce, Electrochem. Commun, 2006, 8, 1487-1491).

A method for preparing a platinum-selenium catalyst supported on carbon, by colloidal organic modification in the presence of sodium citrate and triphenylphosphine as complexing agents, has been described (R. F. Wang, J. Power Sources, 2007, 171, 471-476).

However, the catalysts of the state of the art do not give the possibility of obtaining a satisfactory compromise between electrocatalytic activity and stability in the presence of methanol.

Further, the methods of the state of the art do not allow determination of the optimum composition of the catalyst for obtaining such a compromise.

Thus, a first object of the invention is to propose a method for preparing catalyst nanoparticles for cathode reduction of dioxygen, in particular tolerant to methanol, which provides a solution to all or part of the problems of the methods of the state of the art.

Another object of the invention is to propose a method for preparing catalyst nanoparticles for cathode reduction of dioxygen, and in particular tolerant to methanol, easy to apply and the yield of which is improved, which may thus be transposed to an industrial scale, while having no or very little impact on the environment.

Another object of the invention is to propose a method for preparing catalyst nanoparticles for cathode reduction of dioxygen, and in particular tolerant to methanol, allowing access to catalysts of a novel composition.

The object of the present invention is a method (P1) for preparing catalyst nanoparticles for cathode reduction of dioxygen and tolerant to methanol comprising (a) a metal center comprising at least one transition metal either supported or not supported and selected from platinum, ruthenium, palladium, rhodium or iridium;
(b) a sub-monolayer of a chalcogen selected from selenium or sulfur;
in a molar ratio R (chalcogen/transition metal) of maximum electrocatalytic activity of less than 1;
comprising
i) preparing catalyst nanoparticles comprising a transition metal either supported or not supported covered with a sub-monolayer of the chalcogen in a molar ratio $R^1$ (chalcogen/transition metal) of less than or equal to 1;
ii) preparing an electrochemical cell comprising a working electrode, a reference electrode and an auxiliary electrode, an electrolytic solution comprising methanol and catalyst nanoparticles deposited at the surface of the working electrode with a specific mass ranging from 0.010 to 0.300 mg per $cm^2$ of working electrode;
iii) measuring the electrocatalytic activity of the electrochemical cell by applying an oxidation potential ranging from 0.8 to 1.4 V, under an inert atmosphere and for a duration ranging from 0 to 40 min;
iv) determining the half-wave potential $E_{1/2}$ depending on the application time of the oxidation potential;
v) determining the residual covering rate of the metal center with the chalcogen for which the half-wave potential $E_{1/2}$ is maximum;
vi) determining the value of the ratio R of the catalyst.

By sub-monolayer of a chalcogen, is meant the covering of the metal center with a discontinuous layer of chalcogen at the surface of the metal center.

By molar ratio R of maximum electrocatalytic activity, is meant the molar ratio (chalcogen/transition metal) of the catalyst giving the possibility of obtaining maximum electrocatalytic activity in the presence of methanol.

By catalyst tolerant to methanol, is meant a catalyst for which the electrocatalytic activity is not affected or is only very little affected by the presence of methanol, preferably the electrocatalytic activity is reduced by less than 20% in the presence of methanol.

According to the invention, the ratio $R^1$ may range from 0.001 to 1, preferably from 0.3 to 0.9, advantageously from 0.5 to 0.7.

According to the invention, the metal center may comprise at least one supported transition metal and selected from platinum, ruthenium, palladium, rhodium or iridium.

Advantageously, the metal center comprises supported platinum.

According to the invention, the support may comprise carbon.

According to the invention, the support may comprise amorphous carbon, carbon nanotubes or graphene.

According to the invention, the support may comprise an oxide-carbon composite, preferably selected from $TiO_2$-carbon, $WO_3$-carbon or $SnO_2$-carbon composites.

Advantageously, the method (P1) further comprises,
vii) preparing with stirring a mixture of the transition metal either supported or not supported with a mixture of water and isopropanol in a v/v ratio ranging from 2/1 to 10/1 for a period ranging from 5 to 60 minutes;
viii) adding an inorganic compound comprising a chalcogen in a molar ratio R (chalcogen/transition metal);
ix) stirring at a temperature ranging from 20 to 50° C. for a period ranging from 5 to 24 hours, preferably from 10 to 20 hours;
x) evaporating the water and the isopropanol;

xi) calcining under an inert atmosphere at a temperature ranging from 100 to 400° C., for a period ranging from 30 min to 2 hours.

According to the invention, the water and isopropanol v/v mixture comprises a greater volume of water relatively to the ethanol volume.

Advantageously, according to the invention, the water/isopropanol v/v ratio of step vii) ranges from 3/1 to 7/1, is preferably equal to 5/1.

Advantageously, according to the invention, the inorganic compound of step viii) comprises a chalcogen which may be selected from oxides and salts.

As examples of oxide, mention may be made of selenium oxide.

As examples of salt, mention may be made of sodium sulfide.

According to the invention, the evaporation of the water and of the isopropanol of step x) may be carried out by any customary technique known to one skilled in the art.

For example mention may be made of the method with heating under a controlled atmosphere.

According to the invention, the preparation of the catalyst nanoparticles of step i) may be carried out with any method known to one skilled in the art allowing preparation of catalyst nanoparticles comprising a transition metal either supported or not supported, for which the surface is modified by a sub-monolayer of a chalcogen.

For example, mention may be made of the method described in document U.S. Pat. No. 7,851,399.

Also advantageously, the preparation of catalyst nanoparticles of step i) comprises, i.a) preparing with stirring a mixture of the transition metal supported or not supported with a mixture of water and isopropanol in a v/v ratio ranging from 2/1 to 10/1 for a period ranging from 5 to 60 minutes;

i.b) adding an inorganic compound comprising a chalcogen in a molar ratio $R^1$ (chalcogen/transition metal) of less than or equal to 1;

i.c) stirring at a temperature ranging from 20 to 50° C. for a period ranging from 5 to 24 hours; preferably from 10 to 20 hours;

i.d) evaporating the water and the isopropanol;

i.e) calcining, under an inert atmosphere, at a temperature ranging from 100 to 400° C., for a period ranging from 30 min to 2 hours.

Advantageously, according to the invention, the water and isopropanol v/v mixture of step i.a) comprises a greater volume of water relatively to the ethanol volume.

Advantageously, according to the invention, the water/isopropanol v/v ratio of step i.a) ranges from 3/1 to 7/1, is preferably equal to 5/1.

Advantageously, according to the invention, the inorganic compound of step i.b) comprising a chalcogen may be selected from oxides and salts.

As examples of oxides, mention may be made of selenium oxide.

As examples of salt, mention may be made of sodium sulfide.

According to the invention, the evaporation of the water and of the isopropanol of step i.d) may be carried out by any customary technique known to one skilled in the art.

Mention may for example be made of the method by heating under a controlled atmosphere.

Advantageously, the invention also relates to an improved method (P2) for preparing catalyst nanoparticles.

According to the invention, the method (P2) is a method easy to apply and for which the yield is improved, which may thus be transposed to an industrial scale, while having no or very little impact on the environment.

The definitions and preferred characteristics of the transition metal, of the chalcogen and of the support shown for method (P1) apply to method (P2).

Advantageously, the transition metal is platinum, the chalcogen is selenium, the ratio $R^1$ ranges from 0.5 to 0.7 and the ratio R is less than 0.5, preferably less than or equal to 0.3, advantageously ranges from 0.1 to 0.3.

Also advantageously, the transition metal is platinum, the chalcogen is sulfur, the ratio $R^1$ ranges from 0.5 to 0.7 and the ratio R is less than or equal to 0.5, preferably ranges from 0.1 to 0.3.

Also advantageously, the transition metal is ruthenium, the ratio $R^1$ is less than or equal to 1 and the ratio R is less than or equal to 0.5, preferably ranges from 0.05 to 0.5.

According to the invention, the metal center may also comprise an additional metal either supported or not supported selected from gold, titanium, tin, cobalt, nickel, iron or chromium, preferably titanium.

Advantageously, the additional metal is supported.

The definitions and characteristics of the support shown for the transition metal in method (P1) apply for the support of the additional metal.

According to the invention, the atomic ratio (transition metal/additional metal) in the method (P1) ranges from 1 to 19.

According to the invention, the working electrode of step ii) of the method (P1) comprises a metal selected from gold, titanium, tin, cobalt, nickel, iron, chromium, preferably gold or titanium.

By reference electrode is meant any electrode for which the potential is set.

According to the invention, the reference electrode in the method (P1) may be selected from the customary reference electrodes known to one skilled in the art.

As examples of a reference electrode, mention may be made of the hydrogen standard electrode (HSE) or of the hydrogen reversible electrode (HRE).

According to the invention, the auxiliary electrode in the method (P1) may be selected from customary auxiliary electrodes known to one skilled in the art.

As an example of an auxiliary electrode, mention may be made of carbon electrodes.

According to the invention, the electrolytic solution of step ii) in the method (P1) may be an acid solution.

According to the invention, the electrolytic solution of step ii) in the method (P1) may comprise an acid selected from perchloric acid, phosphoric acid or sulfuric acid.

Advantageously, the electrolytic solution comprises sulfuric acid.

According to the invention, the molar acid concentration of the electrolytic solution of step ii) in method (P1) may range from 0.1M to 2M.

According to the invention, the molar methanol concentration in the electrochemical cell of step ii) in method (P1) may range from 0.1 M to 20M, preferably from 0.5M to 5M.

According to the invention, the oxidation potential of step iii) in method (P1) may vary depending on the nature of the transition metal.

Thus, advantageously, when the transition metal is selected from platinum, rhodium, palladium or iridium, the oxidation potential of step iii) in method (P1) may range from 1 to 1.2V.

By half-wave potential is meant the shape of the wave and its position for an electrochemical system which depends on kinetic conditions, like in the reaction for reducing dioxygen.

According to the invention, the half-wave potential of step iv) in method (P1) may be determined by any customary measurement known to one skilled in the art.

As an example, mention may be made of the measurement by means of the Rotating Disk Electrode (RDE) technique, as for example described in Bard et al. (Bard et al., Electrochemical Methods: Fundamentals and Applications, John Wiley & Sons, NY, 2nd Ed., 2002).

According to the invention, the determination of the residual covering rate of step v) in method (P1) may be carried out by any customary method known to one skilled in the art.

One skilled in the art, depending on the nature of the transition metal of the metal center according to the invention, is able to determine the most suitable method.

As an example of a suitable method for platinum and rhodium, mention may be made of the underpotential deposition of hydrogen as for example described in Elezovic et al. (Elezovic et al., Int. J. Hydrogen Energy 32 (2007), 1991-1998).

It is also possible to mention the method, a so-called CO-stripping method, for example described in the document Vidakovic et al. (Vidakovic et al., Electrochim. Acta 52 (2007), 5606-5613) particularly suitable for platinum, rhodium, ruthenium and iridium.

Mention may also be made of the method by reduction of a monolayer of palladium oxide into palladium, as for example described in Lan-Ian et al. (Lan-Ian et al., Chinese J. Chem. Phys, 23 (2010) 543-548), particularly suitable for palladium.

According to the invention, the value of the ratio R of step vi) is determined from the value of the residual covering rate of the step v) by underpotential deposition of hydrogen determined in a potential range, by adsorption and desorption of a monolayer of hydrogen.

This process corresponds to a charge of 210 $\mu C \cdot cm^{-2}$ for an adsorbed hydrogen monolayer. This method is notably described in Elezovic et al. (Elezovic et al., Int. J. Hydrogen Energy 32 (2007), 1991-1998).

According to the invention, the size of the nanoparticles from the method range from 1 to 10 nm, preferably from 2 to 3 nm.

Another object of the present invention relates to a method (P2) for preparing nanoparticles of a catalyst tolerant to methanol comprising
- a) a metal center comprising at least one metal transition either supported or not supported and selected from platinum, ruthenium, palladium, rhodium or iridium;
- (b) a sub-monolayer of a chalcogen selected from selenium or sulfur;

comprising
- i) preparing with stirring a mixture of the transition metal either supported or not supported with a mixture of water and isopropanol in a v/v ratio ranging from 2/1 to 10/1 for a period ranging from 5 to 60 minutes;
- ii) adding an inorganic compound comprising a chalcogen in a molar ratio (chalcogen/metal center) of less than or equal to 1, preferably ranging from 0.001 to 1;
- iii) stirring at a temperature ranging from 20 to 50° C. for a period ranging from 5 to 24 hours, preferably from 10 to 20 hours;
- iv) evaporating the water and the isopropanol;
- v) calcining, under an inert atmosphere, at a temperature ranging from 100 to 400° C., for a period ranging from 30 min to 2 hours.

According to the invention, the mixture of water and isopropanol of step i) of method (P2) comprises a volume content of water greater than the ethanol volume content.

According to the invention, the water/isopropanol v/v ratio of step i) of method (P2) ranges from 3/1 to 7/1, is preferably equal to 5/1.

According to the invention, the inorganic compound of step ii) of method (P2) comprising a chalcogen may be selected from oxides and salts.

As examples of oxide, mention may be made of selenium oxide.

As examples of salt, mention may be made of sodium sulfide.

According to the invention, the evaporation of the water and of the isopropanol of step iv) of method (P2) may be carried out by any customary technique known to one skilled in the art.

Mention may for example be made of the method by heating under a controlled atmosphere.

Advantageously, the molar ratio (chalcogen/metal center) is less than 0.5, preferably less than or equal to 0.3, advantageously ranges from 0.1 to 0.3.

According to the invention, the catalyst nanoparticles from method (P1) or (P2) are deposited at the surface of a constitutive cathode of a cell, in an amount ranging from 0.1 to 2 mg per $cm^2$ of cathode.

Another object of the present invention relates to catalyst nanoparticles comprising a metal center comprising platinum either supported or not and covered with a sub-monolayer of selenium in a (selenium/platinum) ratio ranging from 0.1 to 0.5, preferably from 0.1 to 0.3, which may be obtained by the method (P1) or (P2) according to the invention.

Another object of the present invention relates to catalyst nanoparticles comprising a metal center comprising platinum either supported or not supported and covered with a sub-monolayer of sulfur in a (sulfur/platinum) ratio ranging from 0.1 to 0.5, which may be obtained by the method (P1) or (P2) according to the invention.

According to the invention, the size of the nanoparticles ranges from 1 to 10 nm, preferably 2 to 3 nm.

Another object of the present invention relates to the use of catalyst nanoparticles according to the invention as a catalyst for the reaction of reduction of dioxygen in the presence of methanol.

Another object of the present invention relates to a cathode for a cell comprising nanoparticles according to the invention.

According to the invention, the cathode may be a cathode for a direct methanol fuel cell, a cathode for a microfluidic fuel cell.

By microfluidic fuel cell, is meant a cell for which the fuel and oxidizer are combined without being mixed as a liquid in the flow of a microchannel, called a Laminar Flow Fuel Cell (LFFC) or a microfluidic fuel cell for which the fuel and oxidizer are mixed, called a Mixed Reactant Fuel Cell (MRFC).

Another object of the present invention relates to a cell comprising a cathode comprising nanoparticles according to the invention.

According to the invention, the cell may be a direct methanol fuel cell.

According to the invention, the cell may be a microfluidic fuel cell.

Advantageously, the cell is a direct methanol microfluidic fuel cell.

According to the invention, the surface of the cathode present in the cell has an amount of catalyst nanoparticles ranging from 0.1 to 2 mg per cm$^2$.

Figure 4:
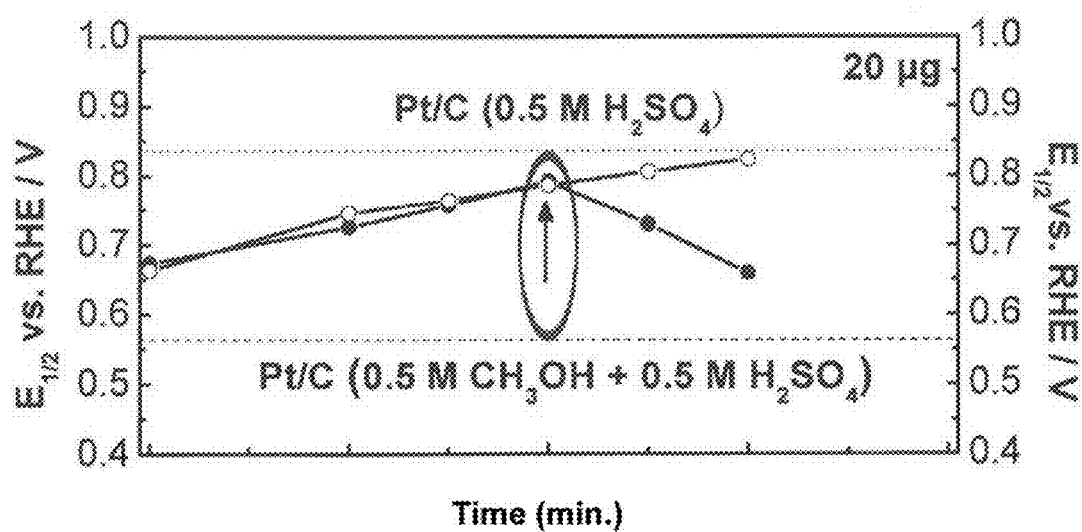
Figure 5:
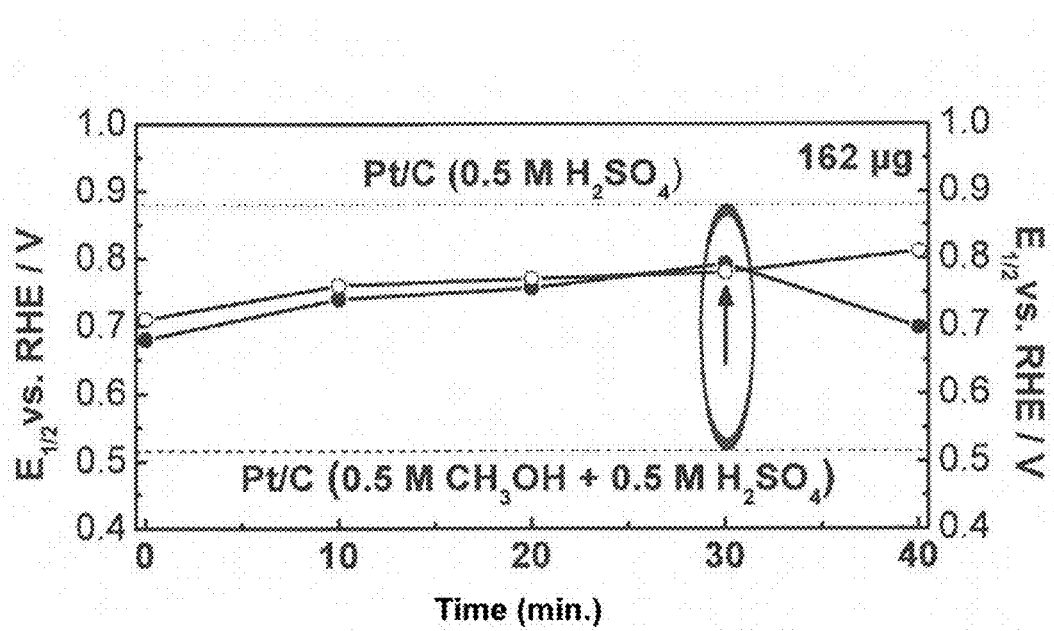
Figure 6:
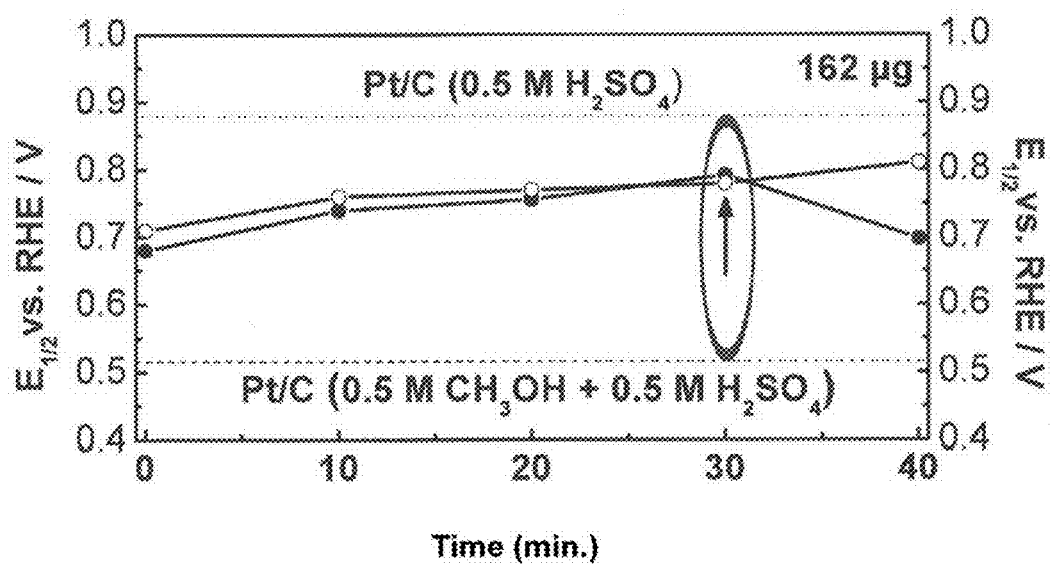

FIGS. 4, 5 and 6 respectively represent the half-wave potential $E_{1/2}$ versus the stripping time comprised between 0 and 40 min and for an amount of deposited catalyst of 20 µg, 81 µg and 162 µg.

Figure 7:
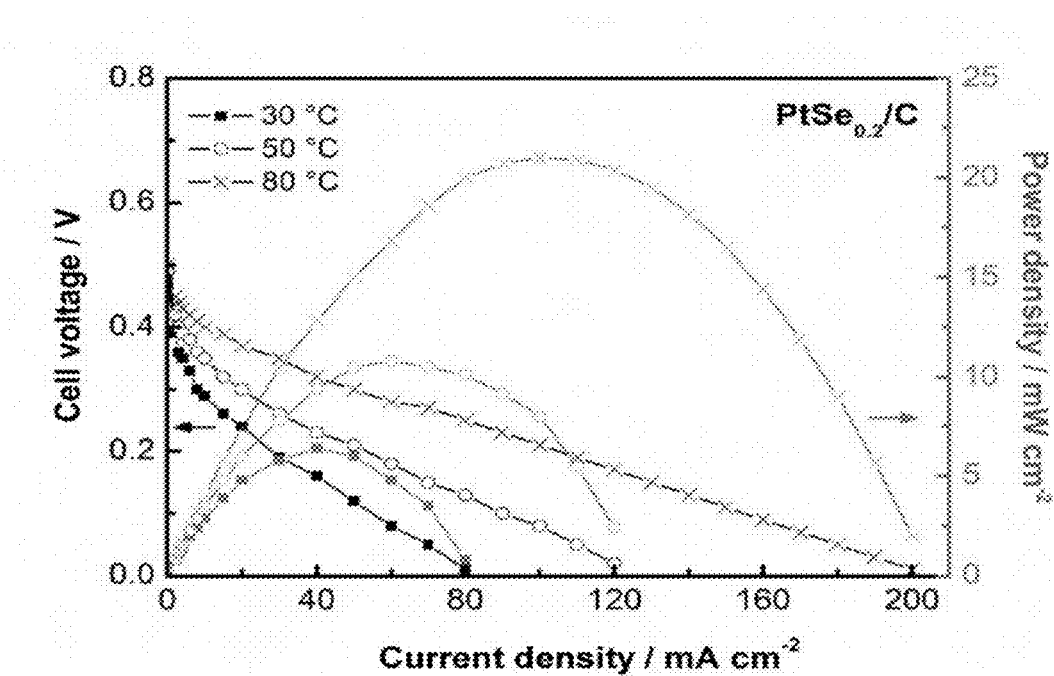

FIG. 7 simultaneously represents the cell voltage curves and the power density curves versus the current density at temperatures of 30° C., 50° C. and 80° C. for catalyst nanoparticles having a molar ratio R (selenium/platinum) equal to 0.2 (PtSe$_{0.2}$/C) in a direct methanol fuel cell (DMFC).

Figure 8:
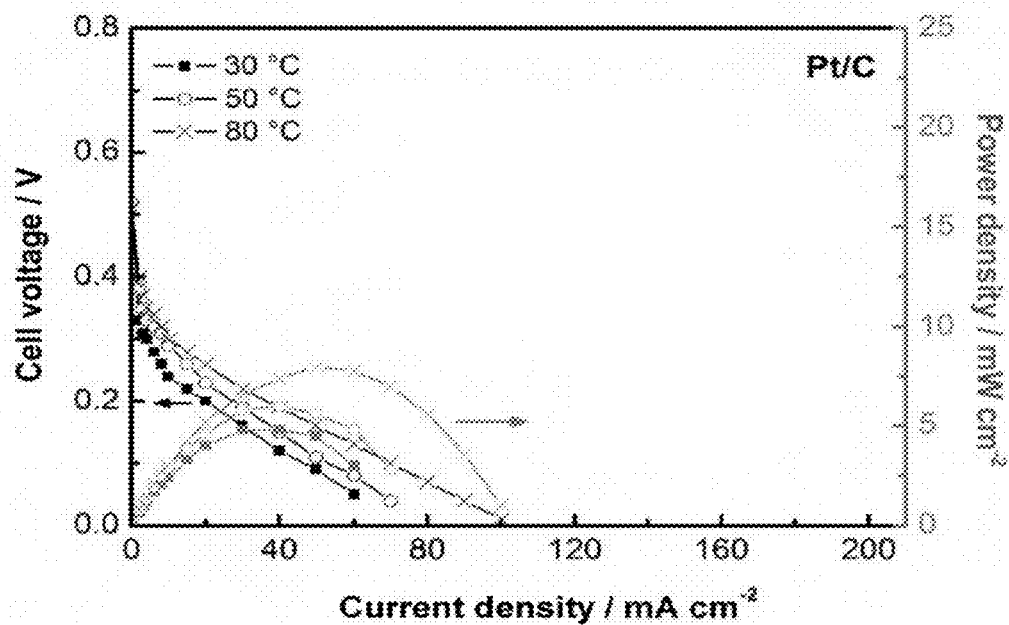

FIG. 8 simultaneously represents the cell voltage curves and the power density curves versus the current density at temperatures of 30° C., 50° C. and 80° C. for Pt/C catalysts in a direct methanol fuel cell (DMFC).

Figure 9:
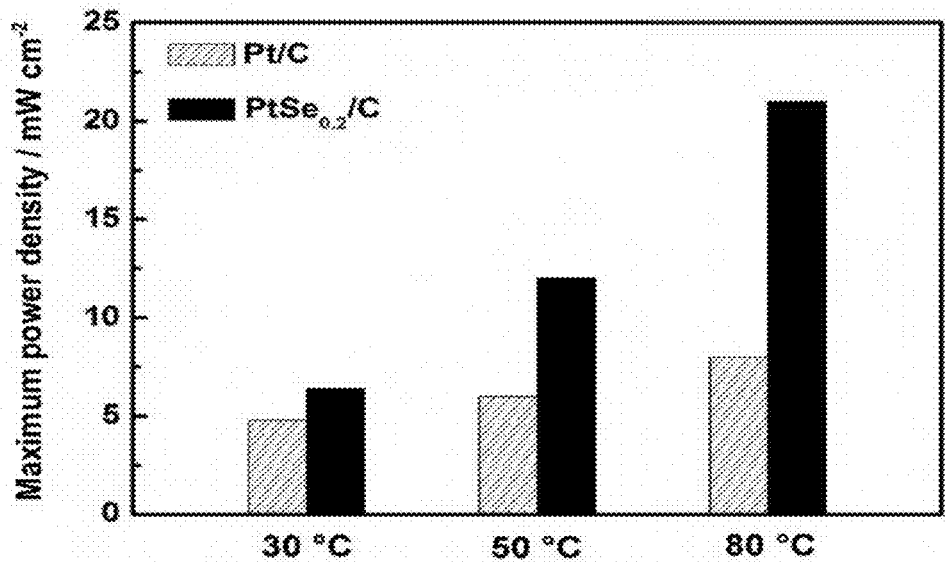

FIG. 9 represents a comparative diagram of the maximum power density values of catalyst nanoparticles having a molar ratio R (selenium/platinum) equal to 0.2 (PtSe$_{0.2}$/C) and of a catalyst (Pt/C) in a direct methanol fuel cell at temperatures of 30° C., 50° C. and 80° C.

Figure 10:
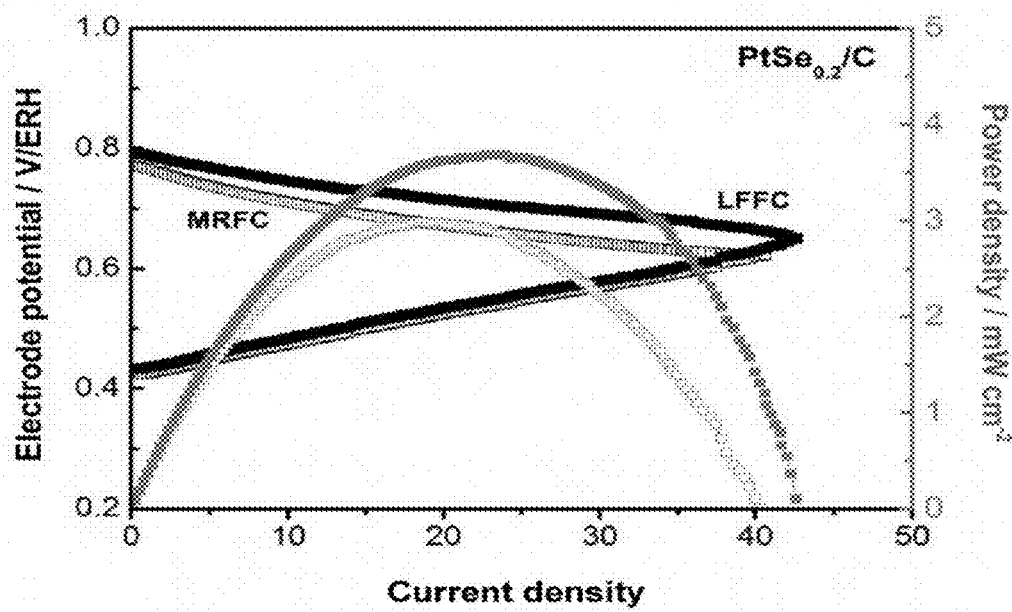

FIG. 10 simultaneously represents the electrode potential curves (cathode and anode) and the power density curves versus the current density at a temperature of 25° C. for nanoparticles of catalysts having a molar ratio R (selenium/platinum) equal to 0.2 (PtSe$_{0.2}$/C) in a microfluidic cell of the LFFC (laminar flow fuel cell) type and of the MRFC (mixed-reactant fuel cell) type.

The different objects of the invention and their embodiments will be better understood upon reading the examples which follow. These examples are given as an indication without any limitation.

EXAMPLE 1: Preparation of Catalyst Nanoparticles of Platinum Supported on Carbon and Covered with a Sub-Monolayer of Selenium in a Molar Ratio (Selenium/Platinum) $R^1$ Equal to 0.5 (PtSe$_{0.5}$/C) According to Step I) of Method (P1) or According to Method (P2)

First of all, a platinum composite supported on carbon (Pt/C) was synthesized by the carbonyl method.

A mixture of sodium hexachloroplatinate of formula Na$_2$PtCl$_6$.6H$_2$O (1 mole) and of sodium acetate (6 moles) in a molar (sodium hexachloroplatinate/sodium acetate) ratio equal to 0.16 was produced under a nitrogen atmosphere for 30 minutes.

The reaction was then activated for 15 minutes at 55° C. in the presence of carbon monoxide with stirring.

A platinum-carbonyl complex was obtained after 24 hours.

Carbon was then added under a nitrogen flow and then the solution was maintained with stirring for 12 h under a nitrogen atmosphere.

The solvent is then evaporated by heating to 80° C. under nitrogen.

The powder of the Pt/C compound was then recovered by washing and filtration with ultrapure water.

Subsequently, the compound (Pt/C) was modified on its surface with selenium atoms by a selenization method.

For this, the compound Pt/C (62.5 mg) and selenium oxide SeO$_2$ (3.8 mg) were mixed in an aqueous solution of isopropanol (30 ml) in a (water/isopropanol) v/v ratio equal to 5 and stirred for 12 h at room temperature.

The resulting powder is heated to 200° C. for 1 h under a nitrogen atmosphere.

The obtained catalyst consists of platinum supported on carbon and modified at the surface with a sub-monolayer of selenium in a (selenium/platinum) molar ratio $R^1$ equal to 0.5.

Example 2: Preparation of Catalyst Nanoparticles Tolerant to Methanol Consisting of Platinum Supported on Carbon and Covered with a Sub-Monolayer of Selenium in a (Selenium/Platinum) Molar Ratio R Equal to 0.2 (PtSe$_{0.2}$/C) According to Method (P1)

In order to end up with catalyst nanoparticles tolerant to methanol, consisting of platinum supported on carbon and covered with a sub-monolayer of selenium in a (selenium/platinum) molar ratio equal to 0.2 (PtSe$_{0.2}$/C), catalyst nanoparticles of Example 1 were used as initial nanoparticles.

Catalyst nanoparticles of Example 1 were introduced into a thermostated electrochemical cell comprising:
- a gold electrode as a working electrode, having a surface area of 0.071 cm$^2$,
- a vitreous carbon electrode as an auxiliary electrode,
- a reversible hydrogen electrode (RHE) as a reference electrode, and
- an acid electrolytic solution comprising water, sulfuric acid (96%, Merck) in a molar concentration equal to 0.5M and methanol (99.9%, Sigma-Aldrich) in a molar concentration equal to 0.5M.

The catalyst nanoparticles were deposited by nebulization with argon at the surface of the working electrode in a specific mass of 0.27 mg/cm$^2$, corresponding to a total mass of 20 µg of catalyst nanoparticles.

An oxidation potential of 1.1V was then applied within the electrochemical cell by means of a potentiostat.

The oxidation potential was applied under an atmosphere saturated with nitrogen for a period of 10, 15, 20, 25 and 30 minutes, called the stripping period.

Figure 1:
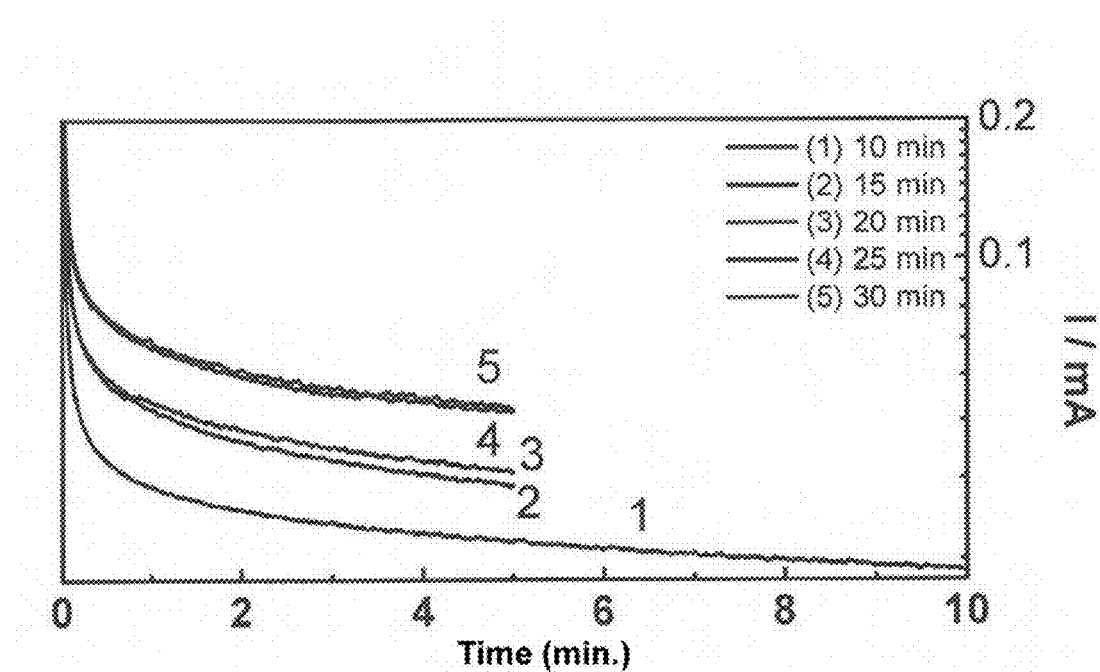
FIG. 1 represents chronoamperometry for different applied stripping durations.
Figure 2:
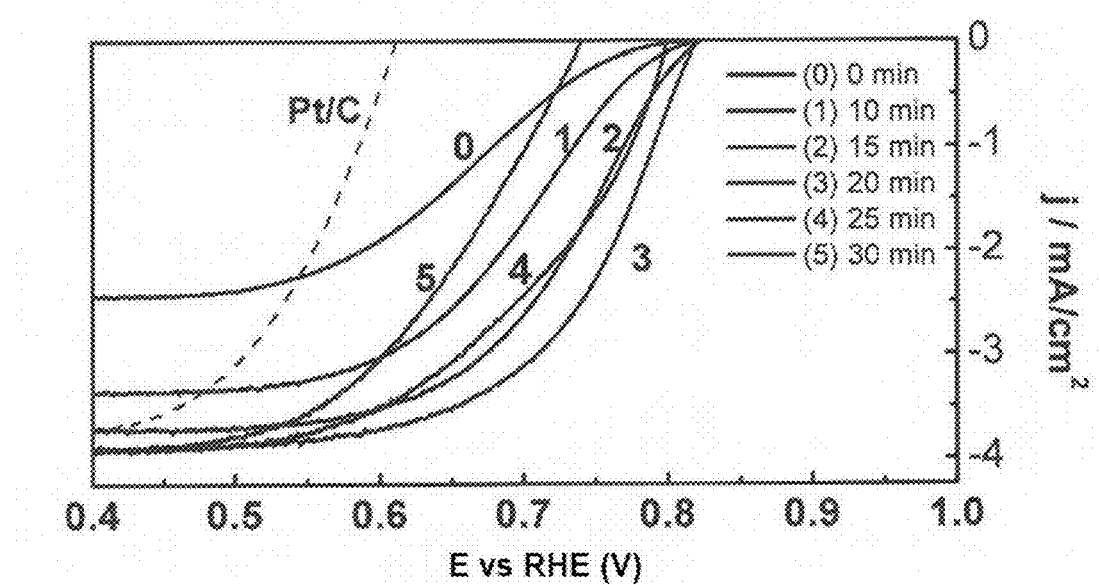
FIG. 2 represents the curves for reducing dioxygen at 900 revolutions per minute measured after the chronoamperometric measurement at 1.1 V for different stripping times.

It may be observed in FIG. 2 that, when the stripping time increases, the mixed region of the cathode curve for the dioxygen reduction reaction is enlarged.

This is demonstrated by the fact that the half-wave potential $E_{1/2}$ increases while the open circuit potential (OCP) remains constant.

For the catalyst comprising platinum supported on carbon or Pt/C, illustrated by a dotted line in FIG. 2, the open circuit potential moves towards a more negative potential. This mixed potential stems from the simultaneous electrochemical oxidation of methanol and from the dioxygen reduction reaction.

This means that the catalyst comprising platinum supported on carbon, but in the absence of a sub-monolayer of selenium, is less tolerant to methanol.

The half-wave potential $E_{1/2}$ for each stripping time was determined by measuring the potential for which the current intensity is equal to half the limiting diffusion current intensity.

To each value of half-wave potential, corresponds a specific composition of a catalyst, characterized by a specific (selenium/platinum) molar ratio R.

Figure 3:
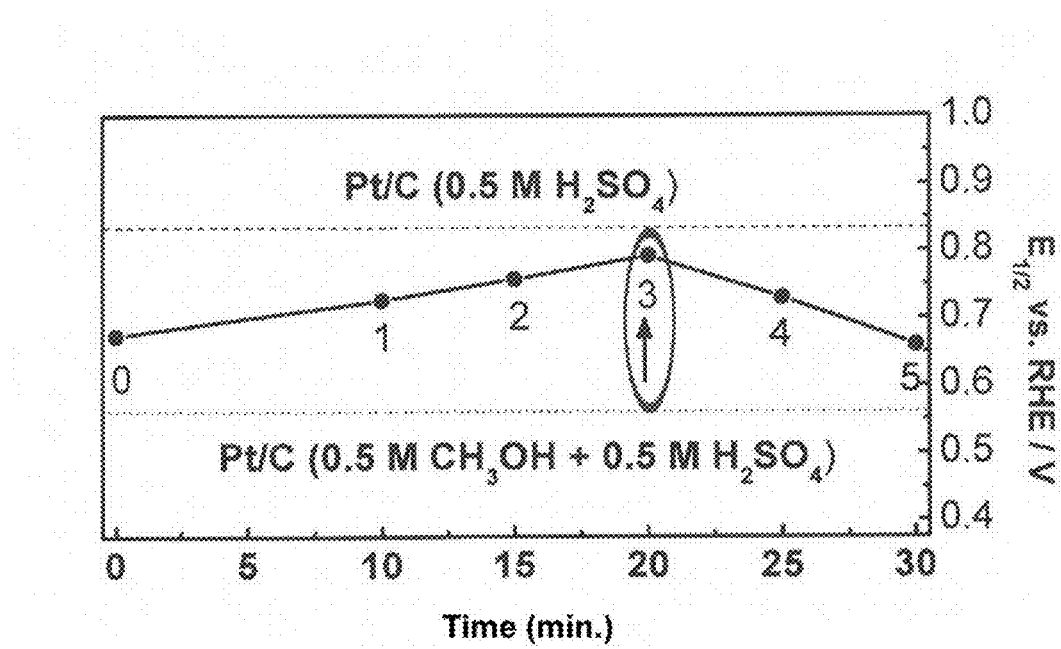
FIG. 3 represents the half-wave potential $E_{1/2}$ versus the stripping duration.

FIG. 3 shows that the half-wave potential of the catalyst attains a plateau for a stripping period equal to 20 min, corresponding to a value close to 0.8V.

For this stripping period and at this value of the half-wave potential, the selenium covering rate exhibits larger activity for the dioxygen reduction reaction (see curve 3 of FIG. 2) while being more tolerant to poisoning with methanol.

For this stripping period equal to 20 min and at this value of the half-wave potential close to 0.8V, the residual covering rate of the platinum supported by the selenium was determined to have a value ranging from 0.15 to 0.2.

For this, the method for deposition under a potential (underpotential deposition of hydrogen) was used as for example described in Elezovic et al. (Elezovic et al, Int. J. Hydrogen Energy 32 (2007), 1991-1998)

From this residual rate, the molar ratio (selenium/platinum) was determined to be at a value close to 0.2.

For this, determination of the active surface by hydrogen potential or CO-stripping deposition was achieved, combined with physical measurements of transmission electron microscopy by means of X-fluorescence.

Thus, it was determined that the maximum electrocatalytic activity for the reaction of reduction of dioxygen in the presence of methanol combined with improved tolerance to methanol is obtained for a catalyst comprising platinum supported on carbon and covered with a sub-monolayer of selenium in a molar ratio R (selenium/platinum) close to 0.2.

Example 3: Evaluation of the Influence of the Amount of Catalyst $PtSe_{0.5}$ Deposited at the Surface of the Working Electrode on the Determination of the Maximum Value of the Half-Wave Potential The method according to Examples 1 and 2 was reproduced for amounts of catalysts $PtSe_{0.5}$ deposited at the surface of the working electrode of 20 µg, 81 µg and 162 µg.

The results described in FIGS. 4, 5 and 6, show that the maximum value of the half-wave potential $E_{1/2}$ only varies very little according to the amount of catalyst deposited at the surface of the working electrode, this value remaining close to 0.8V.

Moreover, the use of different amounts of catalysts allowed determination of the optimum stripping time used for activating the catalyst.

The optimum stripping time corresponds to the time for which the value of the half-wave potential $E_{1/2}$ is maximum, and therefore for which electrocatalytic activity is maximum.

For the catalyst $PtSe_{0.5}$, the optimum stripping time ($t_{strip}$) is related to the amount of catalyst ($m_{cat}$) used through the relationship $t_{strip}*=0.07\ m_{cat}+18.87$.

Thus, it is possible to determine, for different catalyst natures, the optimum stripping time for activating the catalyst; this thereby allowing, within the scope of industrial production of this catalyst, simplification and/or optimization of its manufacturing method.

Example 4: Evaluation of the Power Density in ($mW \cdot cm^{-2}$) According to the Current Density ($mA \cdot cm^{-2}$) of Nanoparticles of Catalysts having a Molar Ratio R (Selenium/Platinum) Equal to 0.2 ($PtSe_{0.2}/C$) in a Direct Methanol Fuel Cell (DMFC) at a Temperature of 30° C., 50° C. and 80° C.

The method according to Example 1 was reproduced for an amount of catalyst $PtSe_{0.2}$ deposited at the surface of the cathode in a specific mass of 0.9 $mg \cdot cm^{-2}$ of Pt.

The direct methanol fuel cell consists of an MEA (membrane electrode assembly) assembly comprising a membrane Nafion® N212 (DuPont) inserted between the anode and the cathode. One face of this membrane is covered with catalyst PtRu/C nanoparticles used as an anode in a specific mass of 1.5 $mg \cdot cm^{-2}$ of Pt; and the other face of this membrane is covered with catalyst $PtSe_{0.2}/C$ nanoparticles used as a cathode in a specific mass of 0.9 $mg \cdot cm^{-2}$ of Pt.

The values of the power density ($mW \cdot cm^{-2}$) versus the current density ($mA \cdot cm^{-2}$) were obtained under the following experimental conditions:

an aqueous phase comprising methanol (99.9% Sigma-Aldrich) in a molar concentration equal to 2M,
a flow rate of the aqueous solution of 100 $ml \cdot min^{-1}$,
an oxygen flow at atmospheric pressure.

It may be observed that the maximum value of the power density of the MEA assembly comprising the catalyst nanoparticles for which the molar ratio R (selenium/platinum) is equal to 0.2 ($PtSe_{0.2}/C$) is equal to 21 $mW \cdot cm^{-2}$ at a temperature of 80° C.

Example 5: Comparison of the Power Densities of Catalyst Nanoparticles for which the Molar Ratio R (Selenium/Platinum) is Equal to 0.2 ($PtSe_{0.2}/C$), and of a Catalyst (Pt/C) in a Direct Methanol Fuel Cell An amount of catalyst Pt/C was deposited at the surface of the cathode in a specific mass of 1 $mg \cdot cm^{-2}$ of Pt.

The values of the power density ($mW \cdot cm^{-2}$) according to the current density ($mA \cdot cm^{-2}$) were obtained under identical experimental conditions with those of Example 4 for a direct methanol fuel cell.

It may be observed that the maximum value of the power density of the MEA assembly comprising the Pt/C nanoparticles in a direct methanol fuel cell is equal to 7 $mW \cdot cm^{-2}$, at a temperature of 80° C.

It may be observed that the values of the power density of the catalyst nanoparticles having a molar ratio R (selenium/platinum) equal to 0.2 ($PtSe_{0.2}/C$) respectively correspond to 6 $mW \cdot cm^{-2}$ for a temperature of 30° C., to 12 $mW \cdot cm^{-2}$ for a temperature of 50° C. and to 21 $mW \cdot cm^{-2}$ for a temperature of 80° C. These values are always greater than the values of the power density of the Pt/C catalysts regardless of temperature. It may also be observed that the value of the power density of catalyst nanoparticles having a molar ratio R (selenium/platinum) equal to 0.2 ($PtSe_{0.2}/C$) is three times greater than the value of the power density of the Pt/C catalyst at a temperature of 80° C.

Example 6: Evaluation of the Power Density ($mW \cdot cm^{-2}$) and of the Potential E of the Cathode and of the Anode (V/RHE) Versus the Current Density ($mA \cdot cm^{-2}$) of the Nanoparticles of Catalysts having a Molar Ratio R (Selenium/Platinum) Equal to 0.2 ($PtSe_{0.2}/C$) in a Microfluidic Cell of the LFFC (Laminar Flow Fuel Cell) Type or of the MRFC (Mixed-Reactant Fuel Cell) Type, at a Temperature of 25° C.

The method according to Example 1 was reproduced for an amount of catalyst $PtSe_{0.2}$ deposited at the surface of the cathode in a specific mass of 0.9 $mg \cdot cm^{-2}$ of Pt.

The microfluidic cell of the LFFC (laminar flow fuel cell) type and the microfluidic cell of the MRFC (mixed-reactant fuel cell) type operate in a self-humidifying mode for the cathode; this mode being known to one skilled in the art.

The microfluidic cell of the LFFC type consists of:
an anode for which the surface is covered with catalyst PtRu/C nanoparticles in a specific mass of 1.5 mg·cm$^{-2}$ of Pt,
a cathode for which the surface is covered with catalyst PtSe$_{0.2}$/C nanoparticles in a specific mass of 0.9 mg·cm$^{-2}$ of Pt,
an SU-8 microchannel with 10-750 geometry having a height of 250 □m, a width of 750 □m and a length of 2,000 □m.

The values for the power density (mW·cm$^{-2}$) and for the potential of the cathode and of the anode (V/RHE) versus the current density (mA·cm$^{-2}$) for the microfluidic cell of the LFFC type were obtained with the following experimental conditions:
a flow of an electrolytic solution comprising sulfuric acid (Sigma-Aldrich) at a concentration of 0.5M and comprising methanol (99.9% Sigma-Aldrich) in a molar concentration equal to 5M,
a second flow of an electrolytic solution comprising sulfuric acid (Sigma-Aldrich) at a concentration of 0.5M without any methanol,
a flow rate of both electrolytic solutions of 3.4 ml·min$^{-1}$.

The microfluidic cell of the MRFC type consists of:
an anode for which the surface is covered with catalyst PtRu/C in a specific mass of 1.5 mg·cm$^{-2}$ of Pt,
a cathode for which the surface is covered with catalyst PtSe$_{0.2}$/C nanoparticles in a specific mass of 0.9 mg·cm$^{-2}$ of Pt,
an SU-8 microchannel of 10-750 geometry.

The values for the power density (mW·cm$^{-2}$) and for the potential of the cathode and of the anode (V/RHE) versus the current density (mA·cm$^{-2}$) for the microfluidic cell of the LFFC type were obtained with the following experimental conditions:
a flow of an electrolytic solution comprising sulfuric acid (Sigma-Aldrich) at a concentration of 0.5M and comprising methanol (99.9% Sigma-Aldrich) in a molar concentration equal to 5M,
a second flow of an electrolytic solution comprising sulfuric acid (Sigma-Aldrich) at a concentration of 0.5M without any methanol,
a flow rate of this electrolytic solution of 3.4 ml·min$^{-1}$.

It may be observed that, the open circuit potential values of the cathode are for the microfluidic cell of the LFFC type and for the microfluidic cell of the MRFC type of 0.8 V and of 0.79V respectively. This small potential difference between both of these types of microfluidic cells shows that the nanoparticles of catalysts according to the invention are highly selective relatively to the electrolytic medium.

It is also possible to observe that, the maximum value of the power density of the nanoparticles of catalysts having a molar ratio R (selenium/platinum) equal to 0.2 (PtSe$_{0.2}$/C), in a microfluidic cell of the LFFC type or of the MRFC type is equal to 3 mW·cm$^{-2}$ and to 3.7 mW·cm$^{-2}$ respectively, at a temperature of 25° C. This small difference between the power density for a microfluidic cell of the LFFC type comprising catalyst nanoparticles according to the invention and the power density for a microfluidic cell of the MFRC type comprising nanoparticles of catalysts according to the invention, shows that the catalyst nanoparticles according to the invention do not deteriorate in the presence of methanol and they retain constant and long-lasting electrocatalytic activity.

These results show that the catalyst nanoparticles according to the invention have similar behaviors and retain their catalytic efficiency regardless of the type of microfluidic cell (LFFC or MFRC).

The invention claimed is:

1. A method for preparing catalyst nanoparticles for cathode reduction of dioxygen and tolerant to methanol comprising:
   (a) a metal center comprising at least one transition metal either supported or not supported and selected from the group consisting of platinum, ruthenium, palladium, rhodium and iridium;
   (b) a sub-monolayer of a chalcogen selected from selenium or sulfur;
   in a maximum electrocatalytic activity molar ratio R (chalcogen/transition metal) of less than 1, the chalcogen being essentially present on the surface of the metal center;
   the method comprising:
   i) preparing catalyst nanoparticles comprising a transition metal either supported or not supported covered with a sub-monolayer of chalcogen in a molar ratio (chalcogen/transition metal) R$^1$ of less than or equal to 1;
   ii) preparing an electrochemical cell comprising a working electrode, a reference electrode and an auxiliary electrode, an electrolytic solution comprising methanol and catalyst nanoparticles deposited at the surface of the working electrode in a specific mass ranging from 0.010 to 0.300 mg per cm$^2$ of working electrode;
   iii) measuring the electrocatalytic activity of the electrochemical cell by applying an oxidation potential ranging from 0.8 to 1.4V, under an inert atmosphere and for a period ranging from 0 to 40 min;
   iv) determining the half-wave potential E$_{1/2}$ depending on the application time of the oxidation potential;
   v) determining the residual covering rate of the metal center by the chalcogen for which the half-wave potential E$_{1/2}$ is maximum; and
   vi) determining the value of the ratio R of the catalyst.

2. The method according to claim 1, wherein the ratio R$^1$ ranges from 0.001 to 1.

3. The method according to claim 1 wherein the metal center comprises at least one transition metal supported and selected from the group consisting of platinum, ruthenium, palladium, rhodium and iridium.

4. The method according to claim 1, wherein the support comprises carbon.

5. The method according to claim 1, wherein the support comprises amorphous carbon, carbon nanotubes or graphene.

6. The method according to claim 1, wherein the support comprises an oxide-carbon composite.

7. The method according to claim 1 wherein the transition metal is platinum and the chalcogen is selenium and the ratio R$^1$ ranges from 0.5 to 0.7 and the ratio R is less than 0.5.

8. The method according to claim 1, wherein the transition metal is platinum and the chalcogen is sulfur and the ratio R$^1$ ranges from 0.5 to 0.7 and the ratio R is less than or equal to 0.5.

9. The method according to claim 1, wherein the metal center also comprises an additional metal either supported or not supported selected from the group consisting of gold, titanium, tin, cobalt, nickel, iron and chromium.

10. The method according to claim 1, wherein the working electrode of step ii) comprises a metal selected from the group consisting of gold, titanium, tin, cobalt, nickel, iron, and chromium.

11. The method according to claim 1, wherein the electrolytic solution of step ii) is an acid solution.

12. The method according to claim 1, wherein the electrochemical cell of step ii) comprises methanol in a molar concentration ranging from 0.1M to 20 M.

13. The method according to claim 1, wherein the transition metal is selected from platinum, rhodium, palladium or iridium and the oxidation potential of step iii) ranges from 1 to 1.2V.

14. The method according to claim 1, wherein the size of the catalyst nanoparticles ranges from 1 to 10 nm.

15. The method according to claim 1 further comprising:
   vii) preparing with stirring a mixture of the transition metal either supported or not supported with a mixture of water and isopropanol in a v/v ratio ranging from 2/1 to 10/1 for a period ranging from 5 to 60 minutes;
   viii) adding an inorganic compound comprising a chalcogen in a molar ratio R (chalcogen/transition metal);
   ix) stirring at a temperature ranging from 20 to 50° C. for a period ranging from 5 to 24 hours;
   x) evaporating the water and the isopropanol;
   xi) calcining, under an inert atmosphere, at a temperature ranging from 100 to 400° C., for a period ranging from 30 min to 2 hours.

16. The method according to claim 1, wherein the preparation of nanoparticles of catalysts of step i) comprises:
   i.a) preparing with stirring a mixture of the transition metal either supported or not supported with a mixture of water and isopropanol in a v/v ratio ranging from 2/1 to 10/1 for a period ranging from 5 to 60 minutes;
   i.b) adding an inorganic compound comprising a chalcogen in a molar ratio $R^1$ (chalcogen/transition metal) of less than or equal to 1;
   i.c) stirring at a temperature ranging from 20 to 50° C. for a period ranging from 5 to 24 hours;
   i.d) evaporating the water and the isopropanol; and
   i.e) calcining, under an inert atmosphere, at a temperature ranging from 100 to 400° C., for a period ranging from 30 min to 2 hours.

17. A method (P2) for preparing nanoparticles of a catalyst tolerant to methanol comprising:
   a) a metal center comprising at least one transition metal either supported or not supported and selected from platinum, ruthenium, palladium, rhodium or iridium;
   (b) a sub-monolayer of a chalcogen selected from selenium or sulfur;
   the method comprising:
   i) preparing with stirring a mixture of the transition metal either supported or not supported with a mixture of water and isopropanol in a v/v ratio ranging from 2/1 to 10/1 for a period ranging from 5 to 60 minutes;
   ii) adding an inorganic compound comprising a chalcogen in a molar ratio $R^1$ (chalcogen/transition metal) of less than or equal to 1;
   iii) stirring at a temperature ranging from 20 to 50° C. for a period ranging from 5 to 24 hours;
   iv) evaporating the water and the isopropanol; and
   v) calcining, under an inert atmosphere, at a temperature ranging from 100 to 400° C., for a period ranging from 30 min to 2 hours.

18. A cathode for a direct methanol fuel cell or for a microfluidic fuel cell comprising catalyst nanoparticles comprising a metal center comprising platinum either supported or not and covered with a sub-monolayer of selenium or with a sub-monolayer of sulfur in a (selenium/platinum) ratio or in a (sulfur/platinum) ratio ranging from 0.1 to 0.5, which may be obtained by the method according to claim 1.

19. The method according to claim 2, wherein the ratio $R^1$ ranges from 0.3 to 0.9.

20. The method according to claim 2, wherein the ratio $R^1$ ranges from 0.5 to 0.7.

21. The method according to claim 6, wherein the oxide-carbon composite is selected from the group consisting of $WO_3$-carbon and $SnO_2$-carbon composites.

22. The method according to claim 7, wherein the ratio R ranges from 0.1 to 0.3.

23. The method according to claim 8, wherein the ratio R ranges from 0.1 to 0.3.

24. The method according to claim 9, wherein the additional metal is titanium.

25. The method according to claim 11, wherein the electrolytic solution of step ii) comprises sulfuric acid.

26. The method according to claim 12, wherein the methanol molar concentration ranges from 0.5 M to 5 M.

27. The method according to claim 14, wherein the size of the catalyst nanoparticles ranges from 2 to 3 nm.

28. The method according to claim 15, wherein (ix) stirring at a temperature ranging from 20 to 50° C. is for a period ranging from 10 to 20 hours.

29. The method according to claim 17, wherein molar ratio $R^1$ is from 0.001 to 1.

30. The method according to claim 17, wherein (iii) stirring is for a period from 10 to 20 hours.

31. The cathode according to claim 17 wherein the selenium/platinum ratio or in a (sulfur/platinum) ratio is from 0.1 to 0.3.

32. The method according to claim 11, wherein the acid in the acid solution is sulfuric acid.

* * * * *